United States Patent [19]

Bauer et al.

[11] Patent Number: 4,946,008

[45] Date of Patent: Aug. 7, 1990

[54] FRICTIONAL DAMPER

[75] Inventors: Hans-Peter Bauer; Hans J. Bauer; Ludwig Stadelmann, all of Altdorf; Dieter Mayer, Sulzbach-Rosenberg, all of Fed. Rep. of Germany

[73] Assignee: SUSPA Altdorf Federungstechnik GmbH, Altdorf, Fed. Rep. of Germany

[21] Appl. No.: 413,368

[22] Filed: Sep. 27, 1989

[30] Foreign Application Priority Data

Oct. 7, 1988 [DE] Fed. Rep. of Germany ....... 3834127

[51] Int. Cl.⁵ .............................................. F16F 7/08
[52] U.S. Cl. .................................. 188/129; 188/381; 188/322.11
[58] Field of Search ........... 188/129, 269, 314, 322.11; 267/134, 135, 139

[56] References Cited

U.S. PATENT DOCUMENTS

| 3,382,955 | 5/1968 | Deyerling | 188/381 X |
| 4,729,458 | 3/1988 | Bauer et al. | 188/129 |
| 4,765,444 | 8/1988 | Bauer et al. | 188/129 |

FOREIGN PATENT DOCUMENTS

| 1110107 | 10/1955 | France | 188/129 |
| 1316737 | 12/1962 | France | 188/129 |

Primary Examiner—Duane A. Reger
Attorney, Agent, or Firm—Browdy and Neimark

[57] ABSTRACT

A frictional damper, in particular for washing machines with spinning action, comprising a circular cylindrical housing and a tappet which is coaxially displaceable inside the housing and extends out of it with one end, the other end being provided with an approximately cylindrical friction piston. The friction piston has at least one friction coating made of an elastically resilient material and is provided with a grease chamber open towards the inner wall of the housing. In order to prevent a loss of damping because of a change from lubricated to dry friction, an extension tube is formed on the end of the tappet which is inside the housing which, together with an adjoining bracing flange and the inner wall of the housing, defines a grease collecting chamber.

6 Claims, 1 Drawing Sheet

U.S. Patent
Aug. 7, 1990
4,946,008
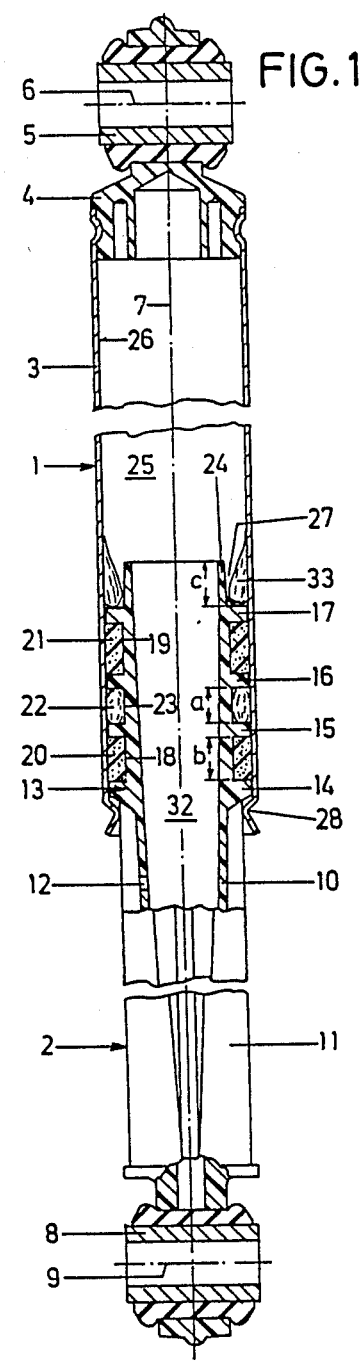
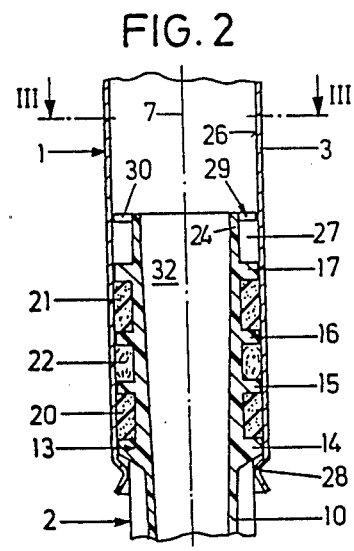
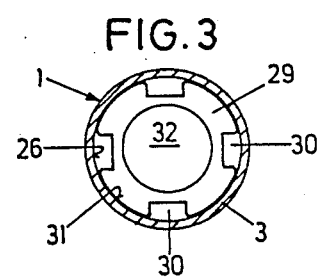

FRICTIONAL DAMPER

BACKGROUND OF THE INVENTION

1. Field of the Invention

The invention relates to a frictional damper, in particular for washing machines with spinning action, essentially comprising a circular cylindrical housing and a tappet which is coaxially displaceable inside it and extends out of it with one end, the other end being provided with an approximately cylindrical friction piston, the friction piston having at least approximately circular cylindrical support segment and bracing flanges radially extending beyond the latter, which are axially limited at fixed distances, a friction coating made of an elastically resilient material being disposed on the support segment and between the bracing flanges and being elastically pressed against the inner wall of the housing, and a grease chamber, opened towards the inner wall of the housing being formed on the friction piston.

2. The Prior Art

Frictional dampers of this type are known from U.S. Pat. No. 4,765,444 and U.S. Ser. No. 850,751, now abandoned. These lubricated frictional dampers have had extraordinary success in practical use; they are used in particular large numbers in washing machines. Customarily the friction coatings comprise cellular, foamed plastic, the cells of the plastic being impregnated with grease. It has been shown that with extreme loads over long periods of time the friction changes from lubricated to dry friction, i.e., the frictional damper heats up to high degree. Damping decreases in this case.

SUMMARY OF THE INVENTION

It is therefore an object of the invention to improve a frictional damper of the type according to the species in such a way that a decrease of damping because of a change from lubricated to dry friction is prevented.

This object is achieved by the invention by an extension rod formed on the end of the tappet which is inside the housing, which, together with the adjacent bracing flange and the inner wall of the housing, defines a grease collecting chamber. By means of the extension tube provided by the invention, the deposition of grease at places in the housing not connected with the friction coating is prevented. In particular, the grease cannot reach the hollow space of the tappet where it is no longer used for lubrication. Grease distributed on the interior wall of the housing when the tappet is extended is dependably collected again during the retraction of the tappet. It is possible from the start to provide the filling of the grease collecting chamber with grease. It is furthermore possible to provide at the friction piston a grease reservoir with a relatively large volume without there being the danger that this grease will also only be wasted.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

Further characteristics, advantages and details of the invention ensue from the following description of two exemplary embodiments by means of the drawings, in which:

FIG. 1 is a longitudinal section of the frictional damper in accordance with the present invention;

FIG. 2 is a partial longitudinal section through a frictional damper incorporating a modified embodiment of the tappet; and FIG. 3 is cross section through the embodiment according to FIG. 2 along the line III—III in FIG. 2.

DETAILED DESCRIPTION OF THE EMBODIMENT

The frictional damper illustrated in the drawings comprises a housing 1 and a tappet 2. The housing 1 essentially consists of a cylindrical metallic pipe 3 closed at one end by means of a bottom 4. A guide sleeve 5 for connecting the frictional damper is disposed on the exterior of the bottom 4. This guide sleeve 5 has an axis of symmetry 6 used as pivoting axis, which vertically intersects the center longitudinal axis 7 of the frictional damper.

The tappet 2 also is provided with a guide sleeve 8 at its extreme end, the axis 9 of which also vertically intersects the center longitudinal axis 7. The tappet 2 is essentially comprised of a pipe 10, which tapers towards the guide sleeve 8 and which is reinforced on its outside by means of longitudinal ribs 11. The pipe 10 is provided with an exhaust opening 12. The tappet 2 is injection-molded of plastic in one piece. A friction piston 1 is formed on the inner end of the tappet 2 located inside the housing 1, which has annular bracing flanges 14, 15 and 16, 17, which are associated in pairs. Between the bracing flanges 14, 15 or 16, 17, respectively associated with each other, approximately circular-cylindrical support segments 18, 19 are provided and are also disposed concentrically to the axis 7. On each of the support segments 18, 19 a friction coating 20, 21 is disposed. These friction coatings 20, 21 consist of cellular, elastic foam material, for example polyurethane foam.

Between the adjoining bracing flanges 15, 16 and thus also between the friction coatings 20, 21, a grease reservoir 22 in the shape of an annular groove is disposed, which has a relatively large volume in comparison to the volume of the friction coatings 20 or 21, and the bottom 23 of which is approximately axially aligned with the support segments 18, 19. Its axial extent a, determined by the distance of the adjoining bracing flanges 15, 16, is approximately 30 to 100% of the axial extent b of the friction coatings 20 or 21. Thus, its volume also is approximately 30 to 100% of the volume of one friction coating 20 or 21 when it is installed.

An extension tube 24 is formed at the inner end of the tappet 2, axially extending by an amount c beyond the bracing flange 17 at the end and approximately corresponding to the extent b. The extension tube 24 may be slightly tapered in the direction towards its free end oriented towards the center longitudinal axis 7, so that a grease collecting chamber 27 is formed, which is open towards the inner chamber 25 of the housing 1 and is defined by the extension tube 24, the associated bracing flange 17 and the inner wall 26 of the pipe 3. It is also filled with grease, however, only partially.

The pipe 3 is provided at its free end with an inwardly facing bead 28 which is applied after insertion of the tappet 2 into the housing 1 in order to prevent unintentional removal of the tappet 2 from the housing 1.

In the modified embodiment according to FIG. 2 and 3, a guide ring 29 is additionally disposed at the free end of the extension tube 24, which has segment-like recesses 30 and thus, on the one hand, has, distributed over its circumference, a plurality of guide surfaces 31 abutting on the inner wall 26 for additional radial guidance of the friction piston 13. On the other hand, during movement of the tappet 2 in a direction out of the housing 1, grease can leave the collecting chamber 27 and remain on the inner wall 26 while, during movement of the tappet 2 in a direction into the housing 1, it again is returned into the collecting chamber 27. In the two embodiments shown grease is prevented, to the largest extent possible, from reaching the hollow chamber 32 of the tappet 2 and there, would no longer be available for the lubricating operation.

It has been indicated in FIG. 1 how grease 33 contained in the grease collecting chamber 27 is drawn out of the housing 1 along the inner wall 26 when the tappet moves out. It furthermore can be seen that in this embodiment it cannot reach the hollow chamber 32 of the tappet 2.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A frictional damper, in particular for washing machines with spinning action, comprising:
   an approximately circular cylindrical housing having an inner wall;
   a tappet which is coaxially displaceable inside the cylindrical housing and extends out of the housing with a first end;
   an approximately cylindrical friction piston provided at a second end of the tappet which is inside the housing the friction piston having at least one approximately circular cylindrical support segment and bracing flanges radially extending beyond the latter, which are axially limited at fixed distances;
   a friction coating made of an elastically resilient material being disposed on the support segment and between the bracing flanges and being elastically pressed against the inner wall of the housing;
   a grease chamber, open towards the inner wall of the housing being formed on the friction piston; and
   an extension tube being formed on the second end of the tappet which tube, together with the adjacent bracing flange and the inner wall of the housing, defines a grease collecting chamber.

2. A frictional damper in accordance with claim 1, wherein the extension tube tapers inwardly in the direction towards its free end.

3. A frictional damper in accordance with claim 1, further comprising a guide ring formed at a free end of the extension tube and abutting against the inner wall of the housing, comprising guide surfaces and which are open towards the inner wall.

4. A frictional damper in accordance with claim 1, wherein the grease collecting chamber is partially filled with grease.

5. A frictional damper in accordance with claim 1, further comprising a grease chamber disposed on the side of the friction coating facing away from the extension tube, the volume of which is at least 30% of the volume of the friction coating.

6. A frictional damper in accordance with claim 1, wherein the friction coating consists of a cellular, foamed plastic.

* * * * *